May 7, 1968 C. H. HARRIS 3,381,883
SANI-SEAL BOX CLOSURE CLIP
Filed Aug. 11, 1966
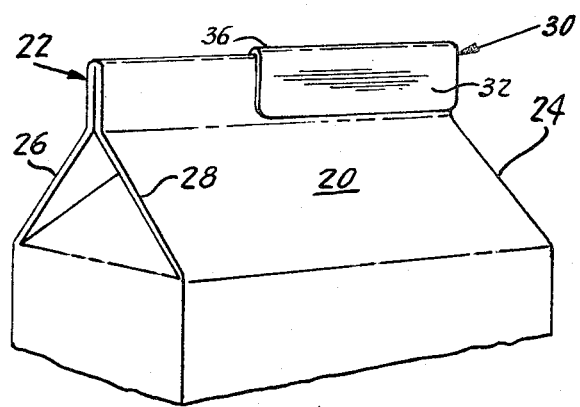
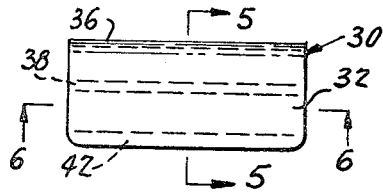
FIG.2
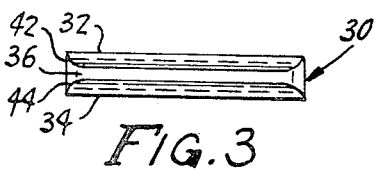
FIG.3
FIG.1
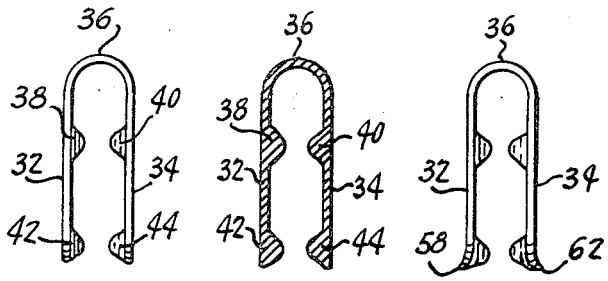
FIG.4  FIG.5  FIG.9
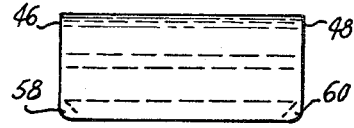
FIG.7
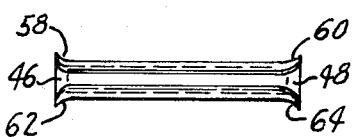
FIG.8
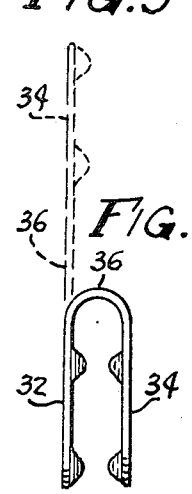
FIG.14
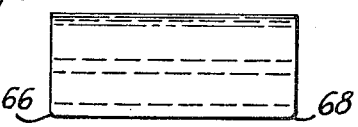
FIG.10
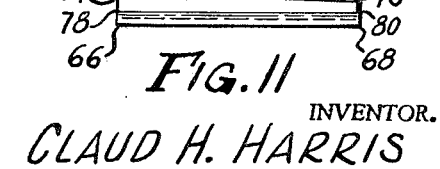
FIG.11
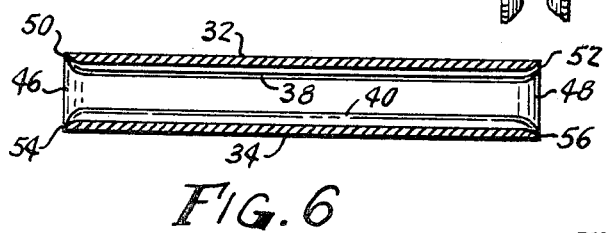
FIG.12  FIG.13
FIG.6
INVENTOR.
CLAUD H. HARRIS
BY Kimmel, Crowell & Weaver
ATTORNEYS.

United States Patent Office 3,381,883
Patented May 7, 1968

3,381,883
SANI-SEAL BOX CLOSURE CLIP
Claud H. Harris, 3440 Fulton Ave., Space 66,
Sacramento, Calif. 95821
Filed Aug. 11, 1966, Ser. No. 571,799
4 Claims. (Cl. 229—47)

ABSTRACT OF THE DISCLOSURE

A closure clip for milk cartons and the like which is in the form of a substantially rigid partially resilient U-shaped member having substantially parallel side walls connected by a bight portion and being in length approximately one-half the length of the milk carton with which it is designed to be used and including a pair of mating parallel ridges internally of the U-shaped member having rounded edges for sliding along and gripping the sealable edges of the milk carton and exerting pressure only along two linear points on the milk carton is disclosed.

---

This invention relates to clips for resealing milk or cream cartons such as are generally made of fiber board or heavy paper and are distributed by dairies and dairy outlets.

The principal object of this invention is to provide a novel clip for quickly and easily receiving milk cartons and the like such as are now in general use by dairies and distributors of milk, cream, soft drinks, fruit juices and other liquids as well as solids.

A further and important object of this invention is the provision of a carton including a clip for forming a novel seal thereon to prevent leakage or seepage of the liquids contained therein.

An additional object of this invention is the provision of a novel clip which is easily fabricated, stored and affixed to cartons at the desired point of use.

An additional object of this invention is the provision of a clip which may be stored on the milk carton when it is originally distributed to the consumer for subsequent use by the consumer.

A further object of this invention is the provision of a clip which is attractive in appearance and easily stored and handled.

Yet another and important object of this invention is the provision of a clip for resealing boxes or cartons to make the ocntainer adaptable for receiving other materials therein for storage than were originally contained in the container. Such materials include water for travelers, picnickers, tourists and the like. Other materials might include frozen foods, both solid and liquid, where the use of the carton or box might require the top to be completely opened, refilled with a new material and re-closed with one or several of the clips of this invention.

An additional object of this invention is the provision of a clip which will permit a milk carton or the like to be reused as a frozen food container to prevent so-called "freezer burn."

Other objects of this invention will become apparent from the specification which follows and the drawing to which reference is now made.

In the drawing:

FIGURE 1 is a perspective view of the present invention showing the carton and the clip in combination.

FIGURE 2 is a side view of the clip of this invention.

FIGURE 3 is a bottom view of the clip of this invention in one of its forms.

FIGURE 4 is an end view of the clip of FIGURE 2 shown in enlarged dimension.

FIGURE 5 is a cross-sectional view taken substantially along lines 5—5 in the direction of the arrows of FIGURE 2 shown in enlarged dimension.

FIGURE 6 is a cross-sectional view of the longitudinal dimension of the clip of FIGURE 2 shown in enlarged dimension taken substantially along lines 6—6 of FIGURE 2 in the direction of the arrows.

FIGURES 7, 8 and 9 are respectively side, bottom and end views of a modification of this invention.

FIGURES 10 and 11 are side and bottom views respectively of a further modification of this invention.

FIGURE 12 is a detail of one end of the clip of FIGURE 2 in combination with a milk carton or the like to form the combinational aspect of this invention.

FIGURE 13 similarly is the combinational aspect of this invention showing the other end of the clip of FIGURE 2 in combination with a milk carton or the like.

FIGURE 14 is an end view of the clip of FIGURE 2 showing a preferred method of fabrication and handling.

With reference now to FIGURE 1, this invention comprises a carton 20 having ends 22 and 24 on the top thereof, each of said ends comprising a plurality of planar members 26 and 28 forming a closure when pressed together in side by side relation and an opening when spaced apart in the manner conventionally used for commercial milk cartons of this type. The clip 30 of this invention in combination with a milk carton such as is known in commerce comprises the combinational aspect of this invention.

As best shown in FIGURES 2, 3, 4, 5 and 6, the clip 30 comprises a pair of spaced, generally parallel panel sides 32 and 34 joined at the top edges by a joint portion 36 which is, in a preferred embodiment, generally semi-cylindrical in shape. It will be understood that the term "generally semi-cylindrical" would include variations from a simple cylinder such as a squaring of the corners or a pointing to vary from a pure cylindrical configuration.

In the preferred embodiment the panel sides 32 and 34 carry respectively gripping ridges 38 and 40 which correspond to each other in parallel relation extending substantially the length of the panel sides. In addition, a second pair of corresponding parallel ridges 42 and 44 may be included and are preferably located proximate the lower edge of the panel sides 32 and 34.

As best shown in FIIGURE 6, clip 30 has ends 46 and 48 and the ends of the corresponding parallel ridges 38 and 40 are sloped from the center of the clip to the respective panel surfaces 32 and 34. It will be realized that the ends of ridges 42 and 44 may desirably be similarly sloped.

A highly preferred embodiment of the clip of this invention is shown in FIGURES 7, 8 and 9. At the ends and at the lower corners of the panel sides 32 and 34 are formed rounded and outwardly flared corner portions 58 and 60 on side 32 and 62 and 64 on side 34.

It will be realized that sloping the ends of the corresponding parallel ridges and providing the outwardly flared corners will make the clip more easily affixed to the carton 20. In addition, the outward flaring of the lower corners of the panel sides 32 and 34 provides a highly desirable decorative appearance.

Of course it will be realized that in a simplified form of the invention the ridges may extend the entire length of the panel sides and be squared at the lower corners 66 and 68 of side 32 and 70 and 72 of side 34, as shown in FIGURES 10 and 11, and the ridges may be squared as shown on the ends 74 and 76 of one ridge and 78 and 80 of the corresponding parallel ridge. This species of the invention does not have the decorative appearance of the species of FIGURE 9 and is perhaps less easily affixed to the carton than the species of FIGURE 6 but is more easily and more economically fabricated and provides an adequate, easily formed seal.

While the panel sides 32 and 34 are generally parallel in a spaced apart relationship, this will be understood to include a slight asymmetry wherein the panel sides 32 and 34 are more closely spaced together at one end 46 than they are at the other end 48. This asymmetry is best shown in FIGURE 11. This has the highly desirable effect, as best illustrated in FIGURES 12 and 13, of making the clip very easily attached and removed from the carton and yet forming a very tight efficient seal. FIGURE 12 shows the end 46 which preferably corresponds to the end 24 of the carton showing the very tight gripping action of the ridges 42 and 44 on the end of the carton 20. The less closely spaced end 48 shows less gripping and may therefore be easily slipped over the end of the carton toward the center of the carton. Thus, all that is necessary is to slip the less closely spaced end of the clip over the end of the carton and inwardly toward the center of the carton until a tight seal is formed by the more closely spaced end 46 of the clip.

In a highly preferred embodiment of this invention, the clip may be constructed of resilient material such as sheet metal or thermo-plastic material in a generally planar configuration and subsequently bent to the U-shaped configuration as shown in FIGURE 14. In the case of metal this bending may be accomplished merely by exerting the necessary force, either by hand or by a properly designed clamping machine. In the case of a thermoplastic material it may be necessary to warm the material in the area of the joining portion 36 to provide the necessary U-shaped resilient configuration and characteristics.

As suggested, the clip may be preferably made of a thermo-plastic material. This material may originally be in the form of a sheet and be molded, extruded, intruded, cast, molded or stamped. Any material which is sufficiently resilient to exert a gripping action on the folded or pressed carton top exceeding the outward force of the planar members of the carton top may be used. Such thermo-plastic materials may include polyvinylchloride which may be reinforced or filled, polystyrene, or other similar polymers and co-polymers which have the desired resilient characteristics. In addition, hard rubber may be used and wooden clips as well. In a highly desired embodiment, however, the clips are made of metal which may be formed and handled in the flat position as shown in FIGURE 14 and hooked on to the carton at the time of manufacture by merely exerting the necessary bending force. Of course such clips may be formed in a single operation and stored for subsequent use or distributed to the ultimate consumer.

Clips are known in the prior art for closure devices but they suffer from disadvantages in that they are difficult to affix to the carton or to the material to be secured because of the continuous friction between the two sides. In the present invention it will be noted that the ridges on each of the panel sides are in alignment with corresponding ridges on the opposite panel. These ridges will bear on only two or four points of the carton thus reducing the friction of the clip when in motion and making it easier to slip it on or off the carton. The ridges will cut two slight grooves in the top closure and thus provide a more or less bulge of the carton material between the grooves as shown in FIGURE 12. These bulges serve to keep the clip in better alignment when in motion. The slight groove formed by each of the ridges will prevent the clip from tipping up or down on either end.

Clips are known in the prior art for performing a similar function but they are often bulky to store and do not form a satisfactory seal. It will be apparent that the simplicity and attractive appearance as well as the easy handling of this clip will be of great utility and convenience.

While the invention has been described with reference to specific configurations and embodiments, it will be realized that modifications may be made in the overall dimensions without departing from the spirit of the invention. Such modifications may become obvious to persons skilled in this art and may depart from the exact structures illustrated in the drawings which are intended merely to be exemplary of the invention and not limiting. The scope of the invention is defined in the appended claims.

I claim:
1. In combination, a carton having a top comprised of a plurality of generally planar members forming a closure when pressed together in side-by-side relation and an opening when spaced apart, a clip received over the top of the carton top edges resiliently forcing the planar members together in the closed position, said clip being integrally formed of a resilient material in a generally U-shaped configuration including a pair of spaced generally parallel sides, said sides being greater in length than in height and including thereon two pairs of corresponding parallel ridges extending substantially the length of the sides for gripping the carton top, and a generally semi-cylindrical joint portion joining the top edges of the two sides, said material having sufficient resiliency to overcome the outward force of the carton edges.

2. A closure clip for paper milk cartons and the like wherein a plurality of carton walls meet along an edge having a length, said closure clip comprising:
an integrally formed generally U-shaped member having spaced generally parallel planar walls connected by a bight portion, said U-shaped member being constructed of a substantially rigid material having only limited resiliency and being only slightly over one-half as long as the length of the carton edge which is to be sealed thereby; and
a pair of rounded parallel ridges on each interior side of the planar walls disposed in opposition to each other such that the respective pairs of walls for the sole contacting portion of the clip and exert pressure on the carton along two parallel linear paths, said clips being so constructed as to exert a sealing force only along approximately one-half of the edge of the carton.

3. The invention of claim 2 wherein the panel sides at one end of the clip are more closely spaced than at the other to permit the clip to be easily slipped over the carton top end.

4. The invention of claim 2 wherein each corner of both panels is rounded and flared outwardly to permit the clip to be more easily applied to the carton top.

References Cited
UNITED STATES PATENTS

| | | | |
|---|---|---|---|
| 2,032,880 | 3/1936 | Kinsley et al. | 229—65 |
| 2,533,539 | 12/1950 | Vivian | 229—65 |
| 2,629,916 | 3/1953 | Footlick | 24—255 |
| 3,086,264 | 4/1963 | Tindall | 24—255 |
| 3,205,549 | 9/1965 | Keech | 24—30.5 |
| 3,217,967 | 11/1965 | Jackson | 229—17 |

JOSEPH R. LECLAIR, *Primary Examiner.*

ROBERT PESHOCK, *Examiner.*